United States Patent Office 3,553,128
Patented Jan. 5, 1971

3,553,128
FIRE FIGHTING METHOD AND COMPOSITIONS
Forrest Arthur Wilson, San Antonio, Tex., assignor to Stull Chemical Company, San Antonio, Tex.
No Drawing. Filed Dec. 20, 1967, Ser. No. 697,271
Int. Cl. C09k 3/28
U.S. Cl. 252—8.1                                     3 Claims

ABSTRACT OF THE DISCLOSURE

A thickened retardant for fighting fire comprising a water-in-oil emulsion having a chemical retardant dispersed in the aqueous phase and the aqueous phase comprising from about 80 to 99.5 parts by weight of the emulsion.

BACKGROUND

This invention relates to thickened fire retardants of the general type commonly employed in fighting forest, range, grass, and brushland wildfires.

Fire retardants may be classified as short-term or long-term retardants. Short-term retardants rely primarily upon the water they contain to prevent combustion. Long-term retardants contain, in addition to water, a chemical that effectively prevents flaming combustion even after the water has evaporated. At present, the most commonly used retardant chemicals are ammonium salts such as ammonium sulfate, diammonium phosphate, and the like.

It is common practice to thicken both long-term and short term retardants with gums or clays in order to improve their capabilities with respect to placement on or confinement to the target, adherence to the fuel surface, moisture barrier buildup between the fuel and flame, moisture retention, chemical retardant deposit on the fuel surface, and the like. Although these thickened retardants are generally considered to be superior to similar unthickened retardants, they nonetheless have many disadvantages and undesirable features.

For example, the ratio between the chemical retardant and the thickener is fixed at the factory with the long-term retardants now available on the market. Thus, any attempt to vary the concentration of chemical retardant in the water to meet changing conditions in the field results in a corresponding variation in thickener concentration, which in turn adversely affects the capabilities of the retardant with regard to target placement, barrier buildup, moisture retention, and chemical retardant deposit on the fuel.

The preblended long-term retardants are not only inflexible in the field but also create substantial inventory and supply problems because the size and location of wildfires cannot be predicted with sufficient accuracy to insure adequate local supplies of retardants with the funds and facilities available for this purpose.

Other difficulties and disadvantages associated with presently known thickened retardants include: presence of abrasives in the blended formulation; high energy required for mixing; cure time required after mixing; variations in viscosity of finished mix; requirement that air drops be made relatively low and slow, thereby subjecting the pilot and aircraft to extremely dangerous conditions; relatively expensive, complex, heavy and immobile equipment required for mixing and applying the retardants; lack of adaptability to continuous or demand mixing techniques; and lack of adaptability for use with existing equipment originally intended for use with water.

SUMMARY

An object of this invention is to provide a thickened fire retardant that obviates the foregoing and other difficulties and disadvantages of presently known retardants.

Another object of the invention is to provide a thickened retardant that is relatively easy to mix and is adaptable for use through existing water pumpers after relatively minor and inexpensive modifications of such equipment.

Another object of the invention is to provide a thickened retardant that can be effectively applied from aircraft at substantially higher speeds and altitudes than is possible with presently known retardants.

A further object of the invention is to provide an improved thickened fire retardant in which the concentration of the water and/or chemical retardant may be varied over wide ranges in the field without requirement of corresponding variations in thickener content of the retardant or significant variations in viscosity of the finished retardant mix.

The foregoing and other objectives are accomplished in accordance with this invention by employment of thickened fire retardants comprising water-in-oil emulsions. This is unexpected inasmuch as it would be anticipated that the external oil phase of such emulsions would cause fires to burn even more intensely. Nonetheless, it has been shown that the emulsified retardants of this invention are just as effective as presently known clay or gum thickened retardants of comparable water and/or chemical retardant content insofar as fire retarding capabilities are concerned, and are considered to be substantially more effective insofar as ease of mixing, field flexibility, safety, adaptability for use with existing water pumpers, viscosity control, adaptability to continuous or demand mixing techniques, and the like are concerned.

The invention can probably best be understood and distinguished over the art by considering the oil phase of the water-in-oil emulsion as being the counterpart of the gum and clay thickeners of presently known thickened retardants. In general, the apparent viscosity of a water-in-oil emulsion increases as the concentration of the oil phase in the emulsion is decreased. In the case of presently known retardants, the concentration of the thickeners must be increased to increase the viscosity. Thus, the viscosities of the retardants of this invention are inversely proportional to the thickener concentration, while the viscosities of the presently known retardants are directly proportional to the thickener concentration.

Ordinarily, the oil phase as supplied at the factory does not contain a chemical retardant, and the oil and water phases are emulsified in the field to produce the thickened retardants of this invention. These retardants may be of either the short-term or long-term type, depending upon whether a chemical retardant is incorporated into the water prior to emulsification. This not only provides maximum flexibility to meet changing conditions in the field, but also substantially reduces inventory and supply problems, since the oil phase is a relatively minor portion of the final retardant mix and chemical retardants can ordinarily be obtained from local sources such as fertilizer distributors.

The concentration and composition of the oil phase portion can vary widely in producing useful water-in-oil emulsion retardants in accordance with this invention. For example, the oil component of the oil phase may comprise carbon tetrachloride or similar substance which in itself has utility in fighting fires. Alternatively, the oil component may be selected without regard to its fire fighting capabilities and with primary reference to properties such as cost, availability, ease of emulsification, emulsifier solubilizing capabilities, volatility, and the like. Surprisingly, xylene has been found to be a particularly useful oil of this type.

As will be understood, the practice of this invention is not limited to the employment of a particular water-in-oil emulsifier. However, it has been found that fatty nitrogen compounds such as fatty amines and derivatives thereof can be used to advantage. Tall oil type amines and derivatives thereof are especially effective as emulsifiers for long-term retardants containing ammonium salts such as ammonium sulfate, diammonium phosphate, and the like.

It has been mentioned priviously that the apparent viscosity of the retardant of this invention is inversely proportional to the concentration of the oil phase portion of the water-in-oil emulsion. This is particularly advantageous since it provides means of increasing the viscosity of a retardant by increasing the concentration of the effective fire fighting ingredients of the retardant mix, rather than by increasing the concentration of the thickener which generally has no appreciable fire control capabilities. At any given concentration of oil phase, the composition of the aqueous phase can be varied from plain water to a highly concentrated solution of chemical retardants without significant adverse changes in viscosity.

At a given concentration of oil phase, the apparent viscosity of the retardant of this invention is influenced by the type and degree of agitation employed in producing the emulsion. In general, mild agitation results in a water-in-oil emulsion of relatively thin, free-flowing characteristics, while vigorous agitation produces a water-in-oil emulsion of relatively thick, semisolid consistency. This is an important feature because it not only provides means for utilizing continuous or demand mixing techniques in the field to produce and apply thickened retardants, but also because it provides means for utilizing existing water pumpers to produce and apply thickened retardants after only minor modification of such equipment.

For example, the oil and aqueous phases of the retardant may be introduced at desired proportions into the suction side of a pump and combined therein with mild agitation so as to produce the relatively thin, free-flowing emulsion. This relatively thin emulsified retardant mix then passes through the pump where it is vigorously agitated and converted essentially instantaneously into a water-in-oil emulsion retardant of relatively thick or even semisolid consistency which is then applied onto the area being threatened by fire. In the case of aerial application, the pump could be the pump now being used to load presently known thickened retardants into the aircraft drop tanks, or the pump could be mounted on the aircraft. In the latter case, the thickened retardant would be prepared and applied with the aircraft itself, rather than being separately prepared with ground mix equipment and then loaded into the aircraft as is now required. Alternatively, the pump might be one presently employed on a water pumper. In any event, only minor modification is required in order to practice the process of this invention with existing equipment and thereby add greatly to the versatility of such equipment.

DETAILED DESCRIPTION

The following examples will serve to additionally describe the invention and preferred embodiments thereof.

EXAMPLE I

Oil phase:
(1) 14% tall oil amine, 86% xylene
(2) 13% tall oil amine, 87% No. 2 diesel
(3) 8% tall oil amine, 92% carbon tetrachloride
(4) 16% tall oil amine, 84% horticultural oil
(5) 12% tall oil amine, 2% acetic acid, 86% xylene
(6) 10% dimethyl soya amine, 2% benzoic acid, 88% xylene Aqueous phase:
(1) 40% ammonium sulfate, 60% water
(2) 15% ammonium sulfate, 85% water
(3) 1% ammonium sulfate, 99% water
(4) each of phases 1, 2, and 3, plus 2 lb./100 gal. of sodium dichromate [1]
(5) 0.2% sodium dichromate [1], 99.8% water
(6) 12% diammonium phosphate, 88% water
(7) 100% pyro [2]

[1] Corrosion Inhibitor. Also imparts contrasting color to retardant for improved visibility.
[2] A liquid chemical retardant concentrate manufactured and distributed by Tennessee Valley Authority containing about 75% by weight of a mixture of various phosphates.

Each oil phase was combined with each aqueous phase to produce water-in-oil emulsions representative of the retardants of this invention. Emulsions having fire retardant capabilities were produced at aqueous phase concentrations ranging from about 50 to over 99 parts by weight of the emulsion. However, taking into account such factors as cost, viscosity, fire retarding capabilities, and the like, it was found that aqueous phase concentrations of at least 80 parts by weight of the emulsion are preferred.

The technique employed in producing the emulsion retardants of this invention is not considered to be critical insofar as their fire fighting capabilities are concerned. However, in accordance with the process feature of the invention, it was found that the emulsions could be advantageously prepared by combining the phases with initial mild agitation so as to produce relatively thin, free-flowing and easily handled water-in-oil emulsions. Subsequently, these initially thin emulsions were subjected to additional and vigorous agitation, thereby converting them to relatively thick, or even semisolid consistencies. A field adaptation of this feature of the invention will be described more fully in the examples to follow.

A welding torch flame was impinged directly on and in close proximity to the thickened retardants of this example. There was no apparent increase in flame intensity or tendency for the surface of the retardants to burn or support combustion. Further, the emulsions exhibited excellent stability and moisture retention capabilities, even during and after direct exposure to the flame. This favorable performance upon exposure to direct flame and intense heat was particularly surprising in the case of the emulsions containing xylene which is known to be relatively volatile and flammable. Although the reason for this phenomena is not known, it is considered to be an important discovery since it provides means for reducing undesirable residues of retardants without adversely affecting their viscosities and/or fire control capabilities as is the case with presently known thickened retardants.

EXAMPLE II

The long-term fire control capabilities of the retardants of this invention were evaluated as follows. A first water-in-oil emulsion was prepared utilizing Oil Phase No. 5 and Aqueous Phase No. 2 of Example I, the composition of the finished emulsion being about 95% aqueous phase and 5% oil phase. The oil and aqueous phases were combined and mixed with mild agitation so as to produce a relatively thin, free-flowing water-in-oil emulsion. This thin emulsion was sprayed at a known rate on a specially prepared fuel bed which had been weighed prior to spraying. The fuel bed was weighed again immediately after spraying and then placed in a drying room until all moisture was evaporated as shown by subsequent weighings. The fuel bed was then burned in a wind tunnel and the rate of spread of the flame noted. It was found that the rate of spread of the flame was substantially less than in an untreated bed and of the same order as presently known thickened retardants applied at comparable rates.

A portion of the foregoing thin emulsion was additionally and vigorously agitated, thereby converting it to a thick, semisolid like consistency. The burn test was repeated with this extremely thick retardant and the results were essentially the same as obtained with the thinner emulsion of the same composition.

A second water-in-oil emulsion was prepared utilizing Oil Phase No. 5 and Aqueous Phase No. 7 of Example I, the proportion being about 97% aqueous phase and 3% oil phase in the finished emulsion. The phases were emulsified with initial mild agitation folowed by additional vigorous agitation, thereby producing a water-in-oil emulsion of a thick, semi-solid like nature. Since the aqueous phase comprised undiluted "Pyro" concentrate, the finished emulsion contained about 5 times more fire retarding salts than presently known thickened retardants of this type when prepared according to published instructions. The standard burn test was repeated with this retardant, except that the volume of material sprayed onto the fuel bed was reduced to only 20% of the volume normally employed. Here again the rate of spread of the flame was substantially less than an untreated bed, and of the same order as the rate of spread in beds treated with presently known thickened retardants of this type at the standard rate. Thus, means have been provided for obtaining a degree of control comparable to the control obtainable with presently known thickened retardants and at the same time reducing the total volume applied by about 80%.

EXAMPLE III

The following will serve to illustrate the process feature of the invention. In a first embodiment, the equipment comprised a mixing tank equipped with a paddle-type agitator and a pump connected at its suction side to an outlet in the tank. A pair of representative oil and aqueous phases, say Oil Phase No. 1 and Aqueous Phase No. 2 of Example I, were introduced at desired proportions into the mixing tank and emulsified therein by brief mild stirring with the paddle agitator. The resulting water-in-oil emulsion was relatively thin and free-flowing, even at aqueous phase concentrations ranging up to 99%. This initially thin emulsion was then pumped from the mixing tank and discharged either into an aircraft drop tank or through a nozzle and directly onto the area being threatened by fire. The vigorous agitation to which the initially thin emulsion is incidently but necessarily subjected as it passes through the pump converts it essentially instantaneously into a relatively thick, semisolid like consistency.

In a second embodiment, the batch mixing tank on the suction side of the pump is replaced with a continuous line mixing device such as a swirl chamber, mixing "T," or the like, the outlet of the line mixer being connected to the pump suction line and the inlets being connected to an oil phase supply tank and an aqueous phase supply tank, respectively. Metering means were provided in the oil and aqueous phase inlet lines for controlling the proportion of the fluids entering the mixer. Thus, with the pump operating and the discharge line therefrom open, the oil and aqueous phases were drawn from their respective supply tanks through the metering devices and into the mixer in desired proportions. The relatively mild agitation to which the oil and aqueous phases were subjected as a consequence of the turbulent flow in the mixer was sufficient to produce a relatively thin, free-flowing water-in-oil emulsion. This thin emulsion was then drawn into the pump where it was vigorously agitated and converted into a relatively thick, semi-solid consistency as it passed through the pump and into the discharge line. Flow of fluid through the system and hence production of retardant can, of course, be stopped by any suitable means such as stopping the pump, closing a valve in the discharge line, and the like.

As will be understood, the equipment and process just described can be utilized to load aircraft or to simultaneously and continuously mix and apply thickened retardants with ground equipment such as the pumpers already deployed in the field and considered to have utility only for applying water or other relatively thin easily handled materials.

EXAMPLE IV

The air drop capabilities of the water-in-oil emulsion retardants of this invention were evaluated as follows. The retardant and process referred to in the first embodiment of Example III were employed to load the drop tanks of an aircraft, the finished emulsion having the specified thick, semisolid like consistency and an aqueous phase concentration of about 97%. The pilot was a veteran of many years experience, having dropped all types of presently known retardants under all possible field conditions with many different types of aircraft. The first run was made at a speed and altitude much greater than normally employed and therefore under substantially safer conditions than those required in order to get effective drops with presently known thickened retardants. In spite of the adverse conditions, there was very little evidence of drift, yet the coverage of the vegetation was considered to be excellent throughout the swatch laid by the aircraft. Expert observers were of the opinion that an adequate long-term fire barrier had been constructed, and this was confirmed by subsequent burn tests after the moisture had evaporated.

In a second run, the same volume of retardant was dropped at a reduced altitude and speed. As was expected, the area covered was substantially reduced and characterized by complete saturation and even uprooting of the vegetation.

From the foregoing, it will be seen that this invention is one well adapted to attain the ends and objectives hereinabove set forth, together with other advantages which are obvious and which are inherent to the composition and process.

It will be understood that certain features and subcombinations are of utility and may be employed without reference to other features and subcombinations.

Since many possible embodiments may be made of the invention without departing from the scope thereof, it is to be understood that the matter herein set forth is to be interpreted as illustrative and not in a limiting sense.

What is claimed is:

1. A method for fighting fire comprising: treating the area being threatened by the fire with a water-in-oil emulsion having a fire retardant dispersed therein in an amount "sufficient to accomplish" its intended purpose.

2. A method for fighting fire according to claim 1 further characterized in that the aqueous phase of said emulsion comprises at least 80 parts by weight of the emulsion and has said fire retardant dispersed therein.

3. A method for fighting fire according to claim 2 further characterized in that said fire retardant comprises an ammonium salt of an inorganic acid.

References Cited

UNITED STATES PATENTS

| | | | |
|---|---|---|---|
| 2,008,847 | 7/1935 | Barclay | 252—2 |
| 2,182,440 | 12/1939 | Kotz et al. | 252—2 |
| 3,041,318 | 6/1962 | Hess | 260—29.6 |
| 3,065,176 | 11/1962 | Blake et al. | 252—309X |
| 3,196,108 | 7/1965 | Nelson | 252—2 |
| 3,311,561 | 3/1967 | Anderson et al. | 252—309X |

FOREIGN PATENTS

| | | | |
|---|---|---|---|
| 507,527 | 6/1939 | Great Britain | 252—2 |
| 778,822 | 7/1957 | Great Britain | 252—309 |

OTHER REFERENCES

Becher, Paul: "Emulsions: Theory and Practice," New York, 1957, p. 359.

JOHN T. GOOLKASIAN, Primary Examiner

D. J. FRITSCH, Assistant Examiner

U.S. Cl. X.R.

169—1; 252—2, 7, 8.05, 309